US006625326B1

(12) United States Patent
Cho

(10) Patent No.: US 6,625,326 B1
(45) Date of Patent: Sep. 23, 2003

(54) EDGE ENHANCEMENT METHOD BY 4-DIRECTIONAL 1-DIMENSIONAL HIGH PASS FILTERING

(75) Inventor: Won-Kyoung Cho, Chollabuk-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/556,680

(22) Filed: Apr. 21, 2000

(30) Foreign Application Priority Data

Jul. 14, 1999 (KR) ........................................ 1999-28466

(51) Int. Cl.[7] ................................................ G06K 9/40

(52) U.S. Cl. ....................................... 382/266; 348/625

(58) Field of Search ................................ 382/266, 254, 382/256, 258, 260, 261, 262, 263, 264, 265, 274, 275, 270; 348/606, 631, 597, 618, 625; 358/3.01, 3.06, 3.15, 3.26

(56) References Cited

U.S. PATENT DOCUMENTS 4,399,461 A * 8/1983 Powell ........................ 348/625
4,476,497 A * 10/1984 Oshikoshi et al. .......... 358/3.24
5,374,995 A * 12/1994 Loveridge et al. .......... 358/447
5,481,628 A * 1/1996 Ghaderi ....................... 382/261
5,819,035 A * 10/1998 Devaney et al. ............ 709/202
5,912,744 A * 6/1999 Nakane ....................... 358/447
5,926,577 A * 7/1999 Kasahara et al. ........... 382/266
5,974,193 A * 10/1999 Baudouin .................... 382/261

* cited by examiner

*Primary Examiner*—Jayanti K. Patel
*Assistant Examiner*—Seyed. Azarian
(74) *Attorney, Agent, or Firm*—Robert E. Bushnell, Esq.

(57) ABSTRACT

An edge enhancement method by 4-directional 1-dimensional high pass filtering characterized in that 4 adjacent pixels positioned at a pixel point at which the primary pixel has euclidean distance of 2 in direction of right, left, up, and down, another 4 adjacent pixels positioned at a pixel point at which the primary pixel has euclidean distance of $2\sqrt{2}$ in 45° and 135° direction, and 9 pixels including the primary pixel are masked by a window mask, and if the maximum difference of the surround pixels which are masked is greater than a predetermined reference difference, each edge enhancement value is calculated by performing 1-dimensional high pass filtering in column, row, 45°, and 135° direction centered from the primary pixel using the pixel values which are masked to the window mask. If the primary pixel is greater than the average value of the pixels which are masked to the window mask, the primary pixel is substituted by the maximum edge enhancement value among the above-calculated each edge enhancement value. If the primary pixel is less than the average value of the pixels, the primary pixel is substituted by the minimum edge enhancement value.

20 Claims, 3 Drawing Sheets

| | | |
|---|---|---|
| −1 | −1 | −1 |
| −1 | 9 | −1 |
| −1 | −1 | −1 |

EDGE ENHANCEMENT METHOD BY 4-DIRECTIONAL 1-DIMENSIONAL HIGH PASS FILTERING

CLAIM OF PRIORITY

This application makes reference to, incorporates the same herein, and claims all benefits accruing under 35 U.S.C. §119 from an application entitled EDGE ENHANCEMENT METHOD BY 4-DIRECTIONAL 1-D HIGH PASS FILTERING earlier filed in the Korean Industrial Property Office on the day of Jul. 14, 1999, and there duly assigned Serial No. 28466/1999, a copy of which is annexed hereto.

BACKGROUND OF THE INVENTION

1. Technical Field

The present invention relates to an edge enhancement method, and more particularly to an edge enhancement method utilizing high pass filtering.

2. Related Art

Devices which utilize a scanner when reading documents can sometimes produce a low quality image. One example of a device which utilizes a scanner is a facsimile device. The image processing methods used by the facsimile device can result in a low quality image.

Image processing methods can include an analysis of neighboring pixels in a digitized image. Imagine a digitized picture of a white object resting on a black floor. Suppose that a small neighborhood of adjacent pixels in this picture are analyzed. If the gray values of the adjacent pixels do not change, then one can conclude that one is looking at a portion of the picture that is either within the object or within the dark background. However, if the gray values of the adjacent pixels do change, then one can conclude that one is looking at the edge of the object. In this way, areas with constant gray values and areas which correspond to edges can be identified. Efforts have been made to improve image processing methods.

Exemplars of recent efforts in the art include U.S. Pat. No. 4,399,461 for Electronic Image Processing issued to Powell, U.S. Pat. No. 5,481,628 for Method And Apparatus For Spatially Variant Filtering issued to Ghaderi, U.S. Pat. No. 5,819,035 for Post-Filter For Removing Ringing Artifacts Of DCT Coding issued to Devaney et al., U.S. Pat. No. 5,912,744 for Image Forming Apparatus Having Image Processing Unit Containing A Plurality Of Filters Arranged In Parallel To Each Other issued to Nakane, U.S. Pat. No. 5,926,577 for Video Signal Processing Apparatus With Noise Reduction And Edge Enhancement issued to Kasahara et al., and U.S. Pat. No. 5,974,193 for Relating To Noise Reduction issued to Baudouin.

While these recent efforts provide advantages, I note that they fail to adequately provide an edge enhancement method by 4-directional 1-dimensional high pass filtering.

SUMMARY OF THE INVENTION

It is an object of the present invention to provide a novel and elegant edge enhancement method in which edge components are highlighted in documents.

It is a further object of the present invention to provide an improved method in which edge components are highlighted in documents having both images and text characters.

It is a further object of the present invention to provide an edge enhancement method by 4-directional 1-dimensional high pass filtering in which edge components are highlighted in documents having both image and character so as to allow more clear print of character.

To achieve these and other objects in accordance with the principles of the present invention, as embodied and broadly described, the present invention provides an edge enhancement method by 4-directional 1-dimensional high pass filtering characterized in that 4 adjacent pixels positioned at a pixel point at which the primary pixel has euclidean distance of 2 in direction of right, left, up, and down, another 4 adjacent pixels positioned at a pixel point at which the primary pixel has euclidean distance of $2\sqrt{2}$ in 45° and 135° direction, and 9 pixels including the primary pixel are masked by a window mask, and if the maximum difference of the surround pixels which are masked is greater than a predetermined reference difference, each edge enhancement value is calculated by performing 1-dimensional high pass filtering in column, row, 45°, and 135° direction centered from the primary pixel using the pixel values which are masked to the window mask. If the primary pixel is greater than the average value of the pixels which are masked to the window mask, the primary pixel is substituted by the maximum edge enhancement value among the above-calculated each edge enhancement value. If the primary pixel is less than the average value of the pixels, the primary pixel is substituted by the minimum edge enhancement value.

To achieve these and other objects in accordance with the principles of the present invention, as embodied and broadly described, the present invention provides a method, comprising the steps of: arranging a primary pixel to be processed with edge enhancement in accordance with a raster scanning order, said primary pixel being selected from a plurality of pixels of an image; masking said primary pixel and eight additional pixels selected from among said plurality of pixels, said eight pixels being adjacent to said primary pixel and including a first four pixels and a second four pixels, said first four pixels being located in a right, left, up, and down direction respectively in relation to said primary pixel, said second four pixels being located in diagonal directions corresponding to 45°, 135°, 225°, and 315° respectively in relation to said primary pixel; calculating a difference between a maximum value and a minimum value of said eight pixels; determining when said calculated difference is greater than a predetermined reference difference; when said calculated difference is less than said predetermined reference difference, outputting said primary pixel not modified; when said calculated difference is greater than said predetermined reference difference, performing the substeps comprising of: determining four enhancement values by performing a first filtering operation in a column direction, a second filtering operation in a row direction, a third filtering operation in a 45° direction, and a fourth filtering operation in a 135° direction, each one of said four filtering operations resulting in one of said four enhancement values, each of said four filtering operations centering on said primary pixel; said first filtering operation in said column direction including said primary pixel and said two pixels located in the up and down direction in relation to said primary pixel, said second filtering operation in said row direction including said primary pixel and said two pixels located in the right and left direction in relation to said primary pixel, said third filtering operation in said 45° direction including said primary pixel and said two pixels located in the 45° and 225° direction in relation to said primary pixel, said fourth filtering operation in said 135° direction including said primary pixel and said two pixels positioned in the 135° and 315° direction in relation to said primary pixel; determining when value of said primary pixel is greater than average value of said four enhancement values; when said primary pixel value is greater than said average value, modifying said primary pixel by replacing said primary pixel value with largest value of said four enhancement values; when said primary pixel value is less than said average value, modifying said primary pixel by replacing said primary pixel value with smallest value of said four enhancement values; and outputting said primary pixel modified.

To achieve these and other objects in accordance with the principles of the present invention, as embodied and broadly described, the present invention provides a method, comprising the steps of: arranging a primary pixel to be processed with edge enhancement in accordance with a raster scanning order, said primary pixel being selected from a plurality of pixels of an image; selecting said primary pixel and eight additional pixels from among said plurality of pixels, said eight pixels being adjacent to said primary pixel and including a first four pixels and a second four pixels, said first four pixels being located in a right, left, up, and down direction respectively in relation to said primary pixel, said second four pixels being located in diagonal directions corresponding to 45°, 135°, 225°, and 315° respectively in relation to said primary pixel; calculating a difference between a maximum gray level value and a minimum gray level value of said eight pixels; determining when said calculated difference is greater than a predetermined reference difference; when said calculated difference is less than said predetermined reference difference, outputting said primary pixel not modified; when said calculated difference is greater than said predetermined reference difference, performing the substeps comprising of: determining four enhancement values by performing a first filtering operation in a column direction, a second filtering operation in a row direction, a third filtering operation in a 45° direction, and a fourth filtering operation in a 135° direction, each one of said four filtering operations resulting in one of said four enhancement values, each of said four filtering operations centering on said primary pixel; determining when gray level value of said primary pixel is greater than average gray level value of said four enhancement values; when said primary pixel gray level value is greater than said average gray level value, modifying said primary pixel by replacing said primary pixel gray level value with largest gray level value of said four enhancement values; when said primary pixel gray level value is less than said average gray level value, modifying said primary pixel by replacing said primary pixel gray level value with smallest gray level value of said four enhancement values; and outputting said primary pixel modified.

To achieve these and other objects in accordance with the principles of the present invention, as embodied and broadly described, the present invention provides a method, comprising the steps of: selecting a primary pixel to be processed with edge enhancement in accordance with a raster scanning order, said primary pixel being selected from a plurality of pixels of an image; masking said primary pixel and eight additional pixels selected from among said plurality of pixels, said eight pixels being adjacent to said primary pixel and including a first four pixels and a second four pixels, said first four pixels being located in a right, left, up, and down direction respectively in relation to said primary pixel, said second four pixels being located in diagonal directions corresponding to 45°, 135°, 225°, and 315° respectively in relation to said primary pixel; calculating a difference between a maximum value and a minimum value of said eight pixels; determining when said calculated difference is greater than a predetermined reference difference; when said calculated difference is less than said predetermined reference difference, outputting said primary pixel not modified; when said calculated difference is greater than said predetermined reference difference, performing the substeps comprising of: determining four enhancement values by performing filtering operations centering on said primary pixel; determining when value of said primary pixel is greater than average value of said four enhancement values; when said primary pixel value is greater than said average value, modifying said primary pixel by replacing said primary pixel value with largest value of said four enhancement values; when said primary pixel value is less than said average value, modifying said primary pixel by replacing said primary pixel value with smallest value of said four enhancement values; and outputting said primary pixel modified.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

Figures 1, 2:
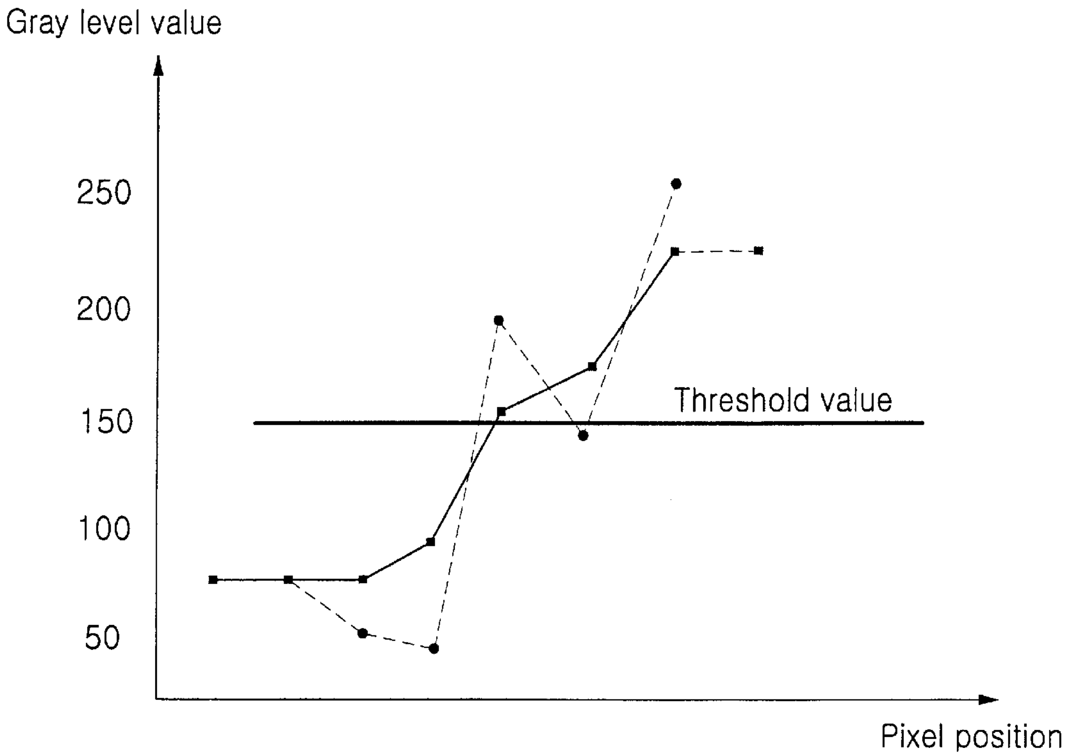
FIG. 1 illustrates gray level value of the original image and gray level value of the edge enhanced image.
FIG. 2 illustrates a window mask where a 1-dimensional edge enhancement filter is expanded to a 2-dimensional edge enhancement filter.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Office automation (OA) equipment has been gaining in popularity. Examples of office automation equipment include printers, scanners, and facsimiles. High performance office automation equipment has been developed for expanding unique functions thereof. In addition, an integrated type office automation equipment has been developed in compliance with the recent tendency toward enhanced diversity of needs of multifunctional equipment so as to thereby reduce cost and space required for installation.

Specifically, in devices such as a facsimile or a multi-functional device which is embedded with a scanner for reading documents, a characteristic of technique for reading an image having a multi-step gray level using a scanner and performing a binarization for the read data is significant in evaluating the performance of the scanner. In addition, such a binarization method is significant in determining print quality in printers.

An image binarization is an image processing technique which can be used when it is required to express a gray level image indicated in multi-step gray level into a binary image having a number of quantizers of 1-bit, that is, 1 or 0. The image binarization technique has signal processing characteristics in that specific data of an image may be maintained and an amount of the processed data can be significantly reduced. Due to such characteristics, the image binarization technique is in a wide use for such fields as an image compression, image outputting, image recognition and the like.

Such a wide application allows a various techniques of image binarization. The most common method is those in that a threshold value is predetermined, allocating 1 to a pixel value higher than the threshold value, and 0 to a pixel value lower than the threshold value, to thereby obtain a binarized image. As described above, the image binarization method is a kind of threshold value-based one where the gray level is classified into upper level and lower level. The most important factor in such a threshold value-based method is a determination on the threshold value. The most simple way to determine the threshold value is to allow an average value of gray level of image as the threshold value. A more precise method employs a density histogram. Recently, a more progressed method like an error diffusion method or a dot diffusion method, that is, an intermediate gray level processing method is disclosed and adopted to various products.

Imagine a digitized picture of a white object resting on a black floor. Suppose that a small neighborhood of adjacent pixels in this picture are analyzed. If the gray values of the adjacent pixels do not change, then one can conclude that one is looking at a portion of the picture that is either within the object or within the dark background. However, if the gray values of the adjacent pixels do change, then one can conclude that one is looking at the edge of the object. In this way, areas with constant gray values and areas which correspond to edges can be identified.

As a pre-process technique to achieve an improved binarization result, a method where an edge of the original image is enhanced via an edge enhancement filter prior to performing a binarization is disclosed. The method which includes an edge enhancement process will result in more high quality binarized images than a method which does not include an edge enhancement process.

The following Table 1 shows an example of a method which includes an edge enhancement process. Let us suppose that the gray level values of an original image are given as those shown in Table 1 below.

TABLE 1

| | | | | | | | |
|---|---|---|---|---|---|---|---|
| 78 | 77 | 76 | 93 | 152 | 176 | 227 | 222 |

Then let us suppose that spatial filtering is performed using the 1×3 edge enhancement mask shown in Table 2 below. The Table 2 shows a filter which can also be referred to as a mask. An operation performed on a neighborhood of pixels can be known as a neighborhood operation. The size of the selected neighborhood of pixels in this instance is one pixel high by three pixels long and thus is rectangular in shape. The selected neighborhood of pixels can be known as the window, the window mask, the filter mask, the filter, or the mask. The mask may be rectangular or any other shape. The mask shown in Table 2 is rectangular and it has a size of 3 pixels.

TABLE 2

| | | |
|---|---|---|
| −1 | 3 | −1 |

When the gray level values of an original image are given as those shown in Table 1, and spatial filtering is performed using the 1×3 edge enhancement mask shown in Table 2, then, the edge enhancement as shown in Table 3 may be achieved.

TABLE 3

| | | | | | |
|---|---|---|---|---|---|
| 77 | 58 | 51 | 187 | 149 | 255 |

A detailed description of the aforementioned spatial filtering using the values of Table 1, Table 2, and Table 3 shall now be set forth. The calculations are shown in detail below.

First, the left most neighborhood of three pixels in Table 1 corresponds to 78, 77, 76. In other words, the leftmost 1×3 matrix of pixels in Table 1 corresponds to 78, 77, 76. An operation known as masking is performed to pre-select these three pixels 78, 77, and 76 in anticipation of the spatial filtering. The spatial filtering is performed on the 1×3 masked pixels using the filter values shown in Table 2. The 1×3 masked pixels 78, 77, and 76 shall now be filtered using the filter shown in Table 2. Each individual value in the filter shown in Table 2 is multiplied by a respective individual value in the aforementioned leftmost 1×3 matrix of the gray level values in Table 1. Therefore, 78 is multiplied by −1 to arrive at −78, then 77 is multiplied by 3 to arrive at 231, and then 76 is multiplied by −1 to arrive at −76. Thereafter, the three resultant values are added together (−78)+231+(−76) to arrive at a result 77. This value of 77 is shown in Table 3 in the position corresponding to the center position of the gray level values shown in Table 1 which were being filtered. The value corresponding to the center position of the values being filtered in Table 1 is 77. Thus the position of the 77 in Table 3 is corresponds to the position of the 77 in Table 1. In other words, the result of the filtering operation is written back to the primary pixel of the filtering operation. In this first calculation shown above, the primary pixel has the gray level value 77 in Table 1.

Second, the next 1×3 matrix of the values in Table 1 corresponds to 77, 76, 93. This 1×3 matrix shall now be filtered using the filter shown in Table 2. Each individual value in the filter shown in Table 2 is multiplied by a respective individual value in the 1×3 matrix of Table 1. Therefore, 77 is multiplied by −1 to arrive at −77, then 76 is multiplied by 3 to arrive at 228, and then 93 is multiplied by −1 to arrive at −93. Thereafter, the three resultant values are added together (−77)+228+(−93) to arrive at a new result 58. This value of 58 is shown in Table 3 in the position corresponding to the center position of the 3 gray level values shown in Table 1 which were being filtered. The value corresponding to the center position of the values being filtered in Table 1 is 76. Thus the position of the 58 in Table 3 is corresponds to the position of the 76 in Table 1. In other words, the result of the filtering operation is written back to the primary pixel. In this calculation, the primary pixel has the gray level value 76 in Table 1.

Third, the next 1×3 matrix of the values in Table 1 corresponds to 76, 93, 152. This 1×3 matrix shall now be filtered using the filter shown in Table 2. Each individual value in the filter shown in Table 2 is multiplied by a respective individual value in Table 1. Therefore, 76 is multiplied by −1 to arrive at −76, then 93 is multiplied by 3 to arrive at 279, and then 152 is multiplied by −1 to arrive at −152. Thereafter, the three resultant values are added together (−76) +279+(−152) to arrive at a new result 51. This value of 51 is shown in Table 3 in the position corresponding to the center position of the 3 gray level values shown in Table 1 which were being filtered. The value corresponding to the center position of the values being filtered in Table 1 is 93. Thus the position of the 51 in Table 3 is corresponds to the position of the 93 in Table 1.

Fourth, the next 1×3 matrix of the values in Table 1 corresponds to 93, 152, 176. This 1×3 matrix shall now be filtered using the filter shown in Table 2. Each individual value in the filter shown in Table 2 is multiplied by a respective individual value in Table 1. Therefore, 93 is multiplied by −1 to arrive at −93, then 152 is multiplied by 3 to arrive at 456, and then 176 is multiplied by −1 to arrive at −176. Thereafter, the three resultant values are added together (−93)+456+(−176) to arrive at a new result 187. This value of 187 is shown in Table 3 in the position corresponding to the center position of the 3 gray level values shown in Table 1 which were being filtered. The value corresponding to the center position of the values being filtered in Table 1 is 152. Thus the position of the 187 in Table 3 is corresponds to the position of the 152 in Table 1.

Fifth, the next 1×3 matrix of the values in Table 1 corresponds to 152, 176, 227. This 1×3 matrix shall now be filtered using the filter shown in Table 2. Each individual value in the filter shown in Table 2 is multiplied by a respective individual value in Table 1. Therefore, 152 is multiplied by −1 to arrive at −152, then 176 is multiplied by 3 to arrive at 528, and then 227 is multiplied by −1 to arrive at −227. Thereafter, the three resultant values are added together (−152)+528+(−227) to arrive at a new result 149. This value of 149 is shown in Table 3 in the position corresponding to the center position of the 3 gray level values shown in Table 1 which were being filtered. The value corresponding to the center position of the values being filtered in Table 1 is 176. Thus the position of the 149 in Table 3 is corresponds to the position of the 176 in Table 1.

The sixth and final calculation is as follows. The next 1×3 matrix of the values in Table 1 corresponds to 176, 227, 222. This 1×3 matrix shall now be filtered using the filter shown in Table 2. Each individual value in the filter shown in Table 2 is multiplied by a respective individual value in Table 1. Therefore, 176 is multiplied by −1 to arrive at −176, then 227 is multiplied by 3 to arrive at 681, and then 222 is multiplied by −1 to arrive at −222. Thereafter, the three resultant values are added together (−176)+681+(−222) to arrive at a new result 283. The value 283 is above the maximum gray level value in this instance. The maximum gray level value in this instance is 255. Thus, the value 283 is necessarily reduced to be equal to the maximum value possible. This value of 255 is shown in Table 3 in the position corresponding to the center position of the gray level values shown in Table 1 which were being filtered. The value corresponding to the center position of the values being filtered in Table 1 is 227. Thus the position of the 255 in Table 3 is corresponds to the position of the 227 in Table 1.

FIG. 1 illustrates gray level value of an original image and gray level value of the edge enhanced image, wherein the solid line denotes the gray level value of the original image and the dotted line denotes the gray level value of the edge enhanced image.

FIG. 2 illustrates a window mask for the case where a 1-dimensional edge enhancement filter as shown in Table 2 above is expanded to become a 2-dimensional edge enhancement filter. The edge enhancement filter as shown in FIG. 2 is a 2-dimensional convolution high pass filter which can be conveniently embodied as hardware with diversity of applications.

However, the edge enhancement filter of FIG. 2 has problems in that the direction of edge enhancement is not considered and a noise is seen as increased due to a disregard of low frequency characteristics.

An edge enhancement method by 4-directional 1-dimensional high pass filtering, in accordance with the principles of the present invention, will now be explained with reference to the attached drawings.

Figure 3:
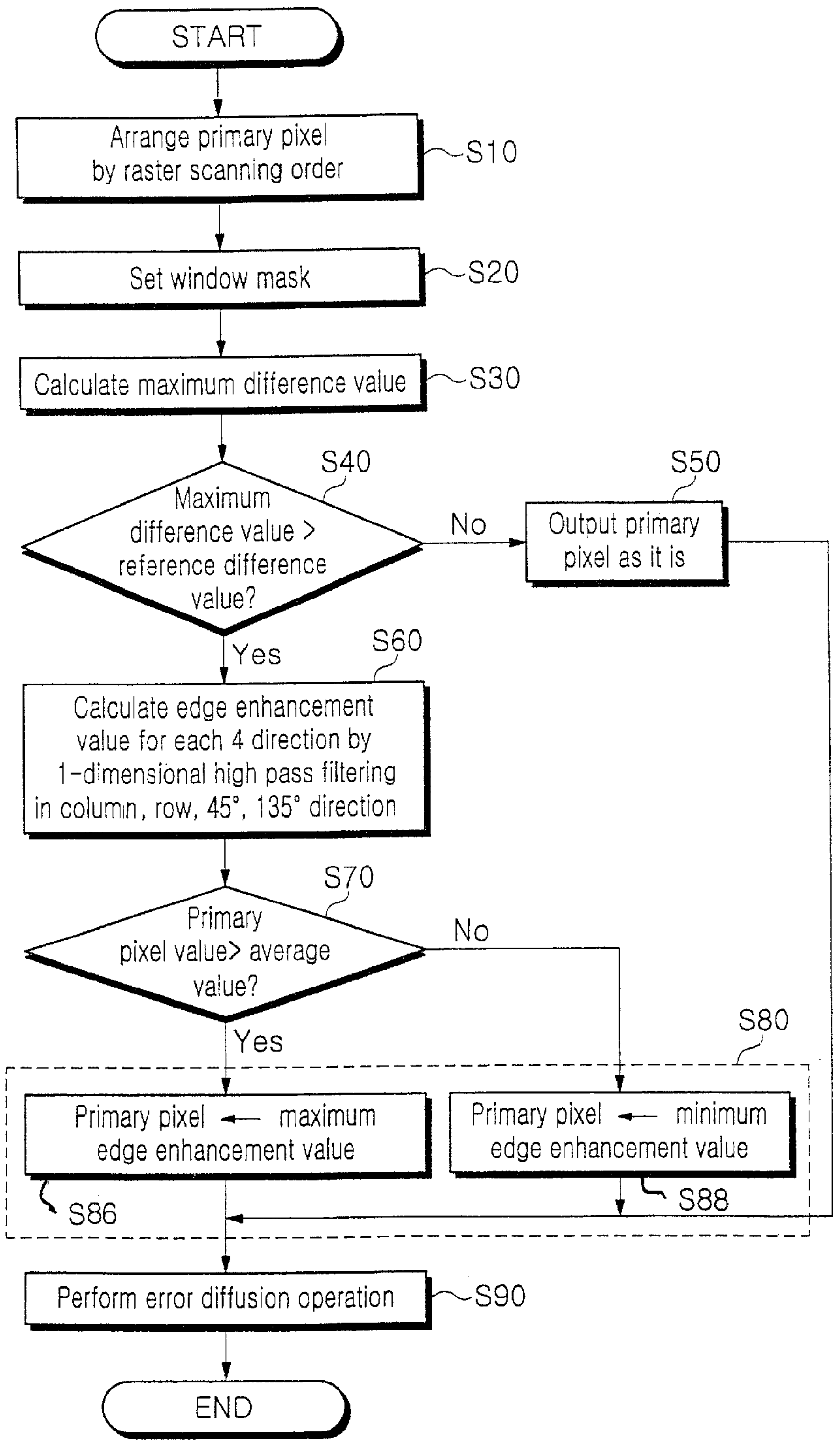
FIG. 3 is a flowchart illustrating an edge enhancement process by 4-directional 1-dimensional high pass filtering, in accordance with the principles of the present invention, according to an embodiment of the present invention.

FIG. 3 is a flowchart illustrating an edge enhancement process by 4-directional 1-dimensional high pass filtering according to an embodiment of the present invention, in accordance with the principles of the present invention.

Referring to FIG. 3, an edge enhancement method of the present invention includes the following steps. At step S10, there is an arranging of a primary pixel to be processed with edge enhancement in accordance with a raster scanning order.

Figure 4:
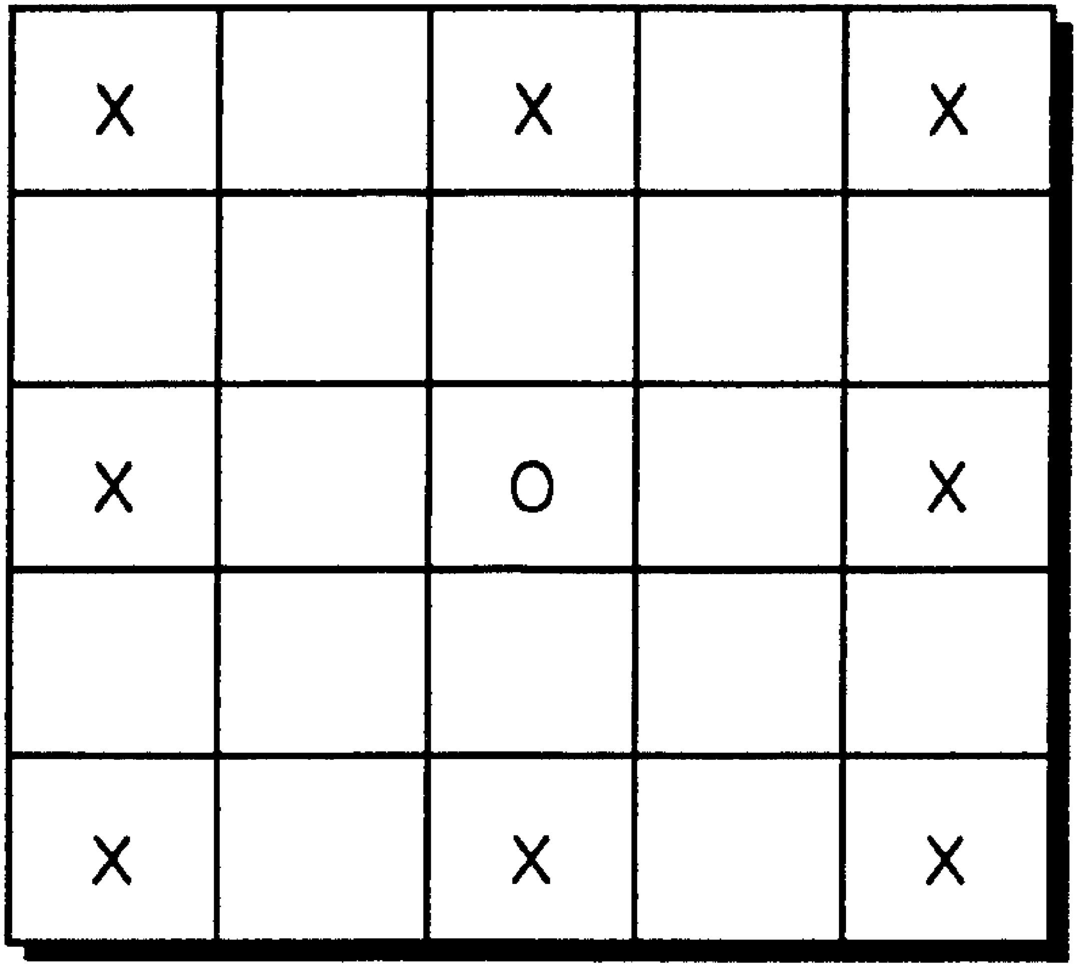
FIG. 4 illustrates a window mask of a 2-dimensional edge enhancement filter used in the embodiment of the present invention, in accordance with the principles of the present invention.

At step S20 of FIG. 3, there is a masking performed by a window mask. The window mask is shown in FIG. 4, in accordance with the principles of the present invention. The window mask utilizes a total of nine pixels, as shown in FIG. 4. The primary pixel is represented by an "o" and the additional eight pixels are each represented by an "x", as shown in FIG. 4.

This window mask is designed to utilize four pixels at pixel points separated from the primary pixel by a euclidean distance of 2, in the four directions of right, left, up, and down, as shown in FIG. 4. This window mask is also designed to utilize 4 more pixels at pixel points separated from the primary pixel by a euclidean distance of $2\sqrt{2}$, in the four diagonal directions of 45 degrees (45°), 135°, 225°, 315°. The four directions of right, left, up, and down can also be referred to as 0° position, the 90° position, the 180° position, and the 270° position, respectively.

In the four directions of right, left, up, and down, each of the four pixels is separated from the primary pixel by exactly one pixel, as shown in FIG. 4. Thus, there is a distance of two pixels from the center of the primary pixel to the center of the pixel in the left direction being utilized by the window mask. Regarding the left direction, a geometric distance equivalent to exactly 2 pixels can be measured from the center of the primary pixel to the center of the pixel utilized by the window mask located in the left direction in relation to the primary pixel, as shown in FIG. 4.

Regarding the right direction, a geometric distance equivalent to exactly two pixels can be measured from the center of the primary pixel to the center of the pixel utilized by the window mask located in the right direction in relation to the primary pixel, as shown in FIG. 4. Regarding the up direction, a geometric distance equivalent to exactly two pixels can be measured from the center of the primary pixel to the center of the pixel utilized by the window mask located in the up direction in relation to the primary pixel, as shown in FIG. 4. Regarding the down direction, a geometric distance equivalent to exactly two pixels can be measured from the center of the primary pixel to the center of the pixel utilized by the window mask located in the down direction in relation to the primary pixel, as shown in FIG. 4.

In the four diagonal directions of 45°, 135°, 225°, 315°, each of the four pixels is separated from the primary pixel by exactly one pixel in a diagonal direction, as shown in FIG. 4. Regarding the 45° direction, a geometric distance equivalent to exactly $2\sqrt{2}$ pixels can be measured in a diagonal direction from the center of the primary pixel to the center of the pixel utilized by the window mask located in the 45° direction in relation to the primary pixel, as shown in FIG. 4.

Regarding the 135° direction, a geometric distance equivalent to exactly $2\sqrt{2}$ pixels can be measured in a diagonal direction from the center of the primary pixel to the center of the pixel utilized by the window mask located in the 135° direction in relation to the primary pixel, as shown in FIG. 4. Regarding the 225° direction, a geometric distance equivalent to exactly $2\sqrt{2}$ pixels can be measured in a diagonal direction from the center of the primary pixel to the center of the pixel utilized by the window mask located in the 225° direction in relation to the primary pixel, as shown in FIG. 4. Regarding the 315° direction, a geometric distance equivalent to exactly $2\sqrt{2}$ pixels can be measured in a diagonal direction from the center of the primary pixel to the center of the pixel utilized by the window mask located in the 315° direction in relation to the primary pixel, as shown in FIG. 4.

Thus, at step S20, the window mask is set to utilize a total of nine pixel positions, including the primary pixel shown as "o" at the center of FIG. 4. The eight pixel positions described above correspond to the eight positions marked with an "x" shown in FIG. 4, located around the primary pixel "o". The four aforementioned specific directions of up, down, left, and right can be summarized as corresponding to two basic directions: a column direction which encompasses up/down, and a row direction which encompasses light/left. In addition, the four aformentioned specific diagonal directions of 45°, 135°, 225°, 315° can be summarized as corresponding to two basic diagonal directions: a 45° diagonal direction which encompasses the 45° direction and also the 225° direction, and a 135° diagonal direction which encompasses the 135° direction and also the 315° direction. Thus, the eight aforementioned specific directions correspond to the following four general directions: column, row, 45°, and 135°.

At step S30, a calculation is performed to determine the maximum difference between the maximum value and minimum value of the pixels which are masked to the window mask shown in FIG. 4. This calculation can be performed using the eight pixels surrounding the primary pixel, and excluding the primary pixel. In the alternative, this calculation can be performed using the nine pixels, including the primary pixel. For purposes of the discussion of step S30 of FIG. 3, this calculation is performed using the eight pixels surrounding the primary pixel, and excluding the primary pixel. This calculation identifies the largest gray level value of the eight surrounding pixels, so identifies the smallest gray level value of the eight surrounding pixels, and then identifies the difference between the largest and smallest values. The difference corresponds to a maximum difference among the gray level values of the eight surrounding pixels.

At step S40, a first determination determines whether the calculated maximum difference is greater than a predetermined reference difference.

If the calculated maximum difference is determined to be less than the predetermined reference difference in the first determination step S40, then step S50 is performed. This situation can correspond to the selected mask of pixels not including an edge, and thus not requiring edge enhancement or filtering. At step S50, the primary pixel is output as it is.

If the calculated maximum difference is determined to be greater than the predetermined reference difference in the first determination step S40, then step S60 is performed. This situation can correspond to the selected mask of pixels including an edge, and thus requiring edge enhancement or filtering. At step S60, calculations are performed to calculate edge enhancement values for each of the four aforementioned general directions. The four general directions are column, row, 45°, and 135°.

The edge enhancement values for each of the four general directions are calculated by performing a one-dimensional high pass filtering in each one of the four directions, centering on the primary pixel for each filtering calculation, using the pixel values which are masked to the window mask. The one-dimensional high pass filtering can be performed using a one-dimensional edge enhancement filter such as the one shown in Table 2 above with values −1, 3, −1.

The one-dimensional high pass filtering performed in the column direction will result in a first edge enhancement value. The one-dimensional high pass filtering performed in the row direction will result in a second edge enhancement value. The one-dimensional high pass filtering performed in the 45° direction will result in a third edge enhancement value. The one-dimensional high pass filtering performed in the 135° direction will result in a fourth edge enhancement value.

Thus, the one-dimensional high pass filtering performed in the four general directions (column, row, 45°, and 135°) will result in four edge enhancement values. Those four edge enhancement values are then added together and then divided by four in order to arrive at an average value of the four edge enhancement values. Then, at step S70, the gray level value of the primary pixel is compared to the average value of the four edge enhancement values.

In other words, at step S70, a determination determines whether the primary pixel value is greater than an average value of the pixels masked to the window mask. The step S80 follows step S70 and encompasses steps S86 and S88.

When the primary pixel value is determined to be greater than the average value of pixels masked to the window mask in the second determination step S70, then step S86 is performed. When the primary pixel value is determined to be less than the average value of pixels masked to the window mask in the second determination step S70, then step S88 is performed.

At step S86, the primary pixel value is replaced by the maximum edge enhancement value among the edge enhancement values for each of the four general directions and the result is output. At step S88, the primary pixel value is replaced by the minimum edge enhancement value among the edge enhancement values for each of the four general directions and the result is output. At step S90, a binarized image is obtained by performing an error diffusion operation on the output primary pixel.

An embodiment of the edge enhancement method by 4-directional 1-dimensional high pass filtering operates as follows. FIG. 4 illustrates a window mask of a 2-dimensional edge enhancement filter used in the embodiment of the present invention.

In step S10, the primary pixel to be processed with edge enhancement is arranged in accordance with raster scanning order. Then, in step S20, four adjacent pixels positioned at a pixel point at which the primary pixel has euclidean distance of 2 in direction of right, left, up, and down, another four adjacent pixels positioned at a pixel point at which the primary pixel has euclidean distance of $2\sqrt{2}$ in the 45° and 135° directions, and nine pixels including the primary pixel are masked by the window mask.

Instead of using a common 3×3 window mask as shown in FIG. 2, an embodiment of the present invention employs an extended window mask while having same number of pixels to be masked, to thereby grasp an overall direction of edge centered from the primary pixel.

Here, another embodiment of the present invention may use the 3×3 window mask as shown in FIG. 2. It is also allowed to use a window mask having a size larger than that of FIG. 4. However, in such a case, euclidean distance between the primary pixel and the surround pixel becomes relatively long, and reliability of edge data obtained from the surround pixels is deteriorated.

In step S30, the maximum difference between the maximum value and minimum value of surround pixels which are masked to the window mask is calculated. Then, in step S40, whether the maximum difference is greater than a predetermined reference difference is determined.

If it is determined that the maximum difference is less than the predetermined reference difference in step S40, then step S50 is performed. The primary pixel is output as it is in step S50. In other words, the primary pixel and the gray level value of the primary pixel are not modified before being output.

If it is determined that the maximum difference is greater than the predetermined reference difference in step S40, then step S60 is performed. Thus, at step S60, edge enhancement values for each of the four general directions are calculated by performing one-dimensional high pass filtering in the column, row, 45°, and 135° directions centered at the primary pixel using the pixel values which are masked to the window mask. Preferably, a one dimensional convolution filter as shown in FIG. 1 is used as the one dimensional high pass filter. That is, it is preferable to use a high pass filter wherein coefficient of filter tab is −1, 3, −1, in sequence.

Then, in step S70, it is determined whether the primary pixel is greater than the average value of pixels masked to the window mask. In step S86, the primary pixel value is replaced with the maximum edge enhancement value among the edge enhancement value for each of the four general directions and the result is output if the primary pixel value is determined as greater than the average value of pixels masked to the window mask in the second determination step S70. In step S88, the primary pixel is replaced with the minimum edge enhancement value and the result is output if the primary pixel value is determined as less than the average value in the second determination step S70. In final step S90, an error diffusion operation is performed on the output primary pixel, thus obtaining a binarized image.

As described above, the present invention allows an effective edge enhancement for character portion in the document where image and character co-exist. As a result, further enhanced quality of character printing can be achieved, eliminating a distortion in the image portion.

The foregoing paragraphs describe the details of an edge enhancement method by 4-directional 1-dimensional high pass filtering, and more particularly, describe the details of an edge enhancement method by 4-directional 1-dimensional high pass filtering in which edge enhancement value with respect to 4-direction, that is, direction in column, row, 45°, and 135°, is calculated by performing 1-dimensional high pass filtering for the above-described 4-directions in a high frequency area, and the maximum edge enhancement value and the minimum edge enhancement value for the 4-directions are output in accordance with whether a primary pixel is greater than an average value of pixels within a window mask or not.

As the terms mentioned in the specification are determined based upon the function of the present invention, and they can be changed according to the technician's intention or a usual practice, the terms should be determined considering overall contents of the specification of the present invention. While specific embodiments of the present invention have been described, various modifications and substitutions will become apparent to one skilled in the art by this disclosure. Such modifications and substitutions are within the scope of the present invention, and are intended to be covered by the appended claims.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method, comprising the steps of:

arranging a primary pixel to be processed with edge enhancement in accordance with a raster scanning order, said primary pixel being selected from a plurality of pixels of an image;

masking said primary pixel and eight additional pixels selected from among said plurality of pixels, said eight pixels being adjacent to said primary pixel and including a first four pixels and a second four pixels, said first four pixels being located in a right, left, up, and down direction respectively in relation to said primary pixel, said second four pixels being located in diagonal directions corresponding to 45°, 135°, 225°, and 315° respectively in relation to said primary pixel;

calculating a difference between a maximum value and a minimum value of said eight pixels;

determining when said calculated difference is greater than a predetermined reference difference;

when said calculated difference is less than said predetermined reference difference, outputting said primary pixel not modified;

when said calculated difference is greater than said predetermined reference difference, performing the substeps comprising of:

determining four enhancement values by performing a first filtering operation in a column direction, a second filtering operation in a row direction, a third filtering operation in a 45° direction, and a fourth filtering operation in a 135° direction, each one of said four filtering operations resulting in one of said four enhancement values, each of said four filtering operations centering on said primary pixel;

said first filtering operation in said column direction including said primary pixel and said two pixels located in the up and down direction in relation to said primary pixel, said second filtering operation in said row direction including said primary pixel and said two pixels located in the right and left direction in relation to said primary pixel, said third filtering operation in said 45° direction including said primary pixel and said two pixels located in the 45° and 225° direction in relation to said primary pixel, said fourth filtering operation in said 135° direction including said primary pixel and said two pixels positioned in the 135° and 315° direction in relation to said primary pixel;

determining when value of said primary pixel is greater than average value of said four enhancement values;

when said primary pixel value is greater than said average value, modifying said primary pixel by replacing said primary pixel value with largest value of said four enhancement values;

when said primary pixel value is less than said average value, modifying said primary pixel by replacing said primary pixel value with smallest value of said four enhancement values; and outputting said primary pixel modified.

2. The method of claim 1, further comprising obtaining a binarized image by performing an error diffusion operation on said primary pixel outputted.

3. The method of claim 1, wherein a length equivalent to 2 pixels can be measured from center of said primary pixel to center of each of said first four pixels, respectively.

4. The method of claim 3, wherein a length equivalent to $2\sqrt{2}$ pixels can be measured from said center of said primary pixel to center of each of said second four pixels, respectively.

5. The method of claim 1, wherein a length equivalent to $2\sqrt{2}$ pixels can be measured from center of said primary pixel to center of each of said second four pixels, respectively.

6. The method of claim 1, wherein a length equivalent to one pixel can be measured from center of said primary pixel to center of each of said first four pixels, respectively.

7. The method of claim 6, wherein a length equivalent to $\sqrt{2}$ pixels can be measured from said center of said primary pixel to center of each of said second four pixels, respectively.

8. The method of claim 1, wherein a length equivalent to $\sqrt{2}$ pixels can be measured from center of said primary pixel to center of each of said second four pixels, respectively.

9. The method of claim 1, said four filtering operations being performed with a one-dimensional high pass filter in which coefficient of filter tab is −1, 3, −1 in sequence.

10. A method, comprising the steps of: arranging a primary pixel to be processed with edge enhancement in accordance with a raster scanning order, said primary pixel being selected from a plurality of pixels of an image;

selecting said primary pixel and eight additional pixels from among said plurality of pixels, said eight pixels being adjacent to said primary pixel and including a first four pixels and a second four pixels, said first four pixels being located in a right, left, up, and down direction respectively in relation to said primary pixel, said second four pixels being located in diagonal directions corresponding to 45°, 135°, 225°, and 315° respectively in relation to said primary pixel;

calculating a difference between a maximum gray level value and a minimum gray level value of said eight pixels;

determining when said calculated difference is greater than a predetermined reference difference;

when said calculated difference is less than said predetermined reference difference, outputting said primary pixel not modified;

when said calculated difference is greater than said predetermined reference difference, performing the substeps comprising of:

determining four enhancement values by performing a first filtering operation in a column direction, a second filtering operation in a row direction, a third filtering operation in a 45° direction, and a fourth filtering operation in a 135° direction, each one of said four filtering operations resulting in one of said four enhancement values, each of said four filtering operations centering on said primary pixel;

determining when gray level value of said primary pixel is greater than average gray level value of said four enhancement values;

when said primary pixel gray level value is greater than said average gray level value, modifying said primary pixel by replacing said primary pixel gray level value with largest gray level value of said four enhancement values;

when said primary pixel gray level value is less than said average gray level value, modifying said primary pixel by replacing said primary pixel gray level value with smallest gray level value of said four enhancement values; and outputting said primary pixel modified.

11. The method of claim 10, said first filtering operation in said column direction including said primary pixel and said two pixels located in the up and down direction in relation to said primary pixel, said second filtering operation in said row direction including said primary pixel and said two pixels located in the right and left direction in relation to said primary pixel, said third filtering operation in said 45° direction including said primary pixel and said two pixels located in the 45° and 225° direction in relation to said primary pixel, said fourth filtering operation in said 135° direction including said primary pixel and said two pixels positioned in the 135° and 315° direction in relation to said primary pixel.

12. The method of claim 10, further comprising obtaining a binarized image by performing an error diffusion operation on said primary pixel outputted.

13. The method of claim 12, wherein a length equivalent to 2 pixels can be measured from center of said primary pixel to center of each of said first four pixels, respectively.

14. The method of claim 13, wherein a length equivalent to $2\sqrt{2}$ pixels can be measured from said center of said primary pixel to center of each of said second four pixels, respectively.

15. The method of claim 14, said four filtering operations being performed with a one-dimensional high pass filter in which coefficient of filter tab is −1, 3, −1 in sequence.

16. The method of claim 12, wherein a length equivalent to $2\sqrt{2}$ pixels can be measured from center of said primary pixel to center of each of said second four pixels, respectively.

17. A method, comprising the steps of:

selecting a primary pixel to be processed with edge enhancement in accordance with a raster scanning order, said primary pixel being selected from a plurality of pixels of an image;

masking said primary pixel and eight additional pixels selected from among said plurality of pixels, said eight pixels being adjacent to said primary pixel and including a first four pixels and a second four pixels, said first four pixels being located in a right, left, up, and down direction respectively in relation to said primary pixel, said second four pixels being located in diagonal directions corresponding to 45°, 135°, 225°, and 315° respectively in relation to said primary pixel;

calculating a difference between a maximum value and a minimum value of said eight pixels;

determining when said calculated difference is greater than a predetermined reference difference;

when said calculated difference is less than said predetermined reference difference, outputting said primary pixel not modified;

when said calculated difference is greater than said predetermined reference difference, performing the substeps comprising of:

determining four enhancement values by performing filtering operations centering on said primary pixel;

determining when value of said primary pixel is greater than average value of said four enhancement values;

when said primary pixel value is greater than said average value, modifying said primary pixel by replacing said primary pixel value with largest value of said four enhancement values;

when said primary pixel value is less than said average value, modifying said primary pixel by replacing said primary pixel value with smallest value of said four enhancement values; and outputting said primary pixel modified.

18. The method of claim 17, said performing of filtering operations corresponding to a performing of a first filtering operation in a column direction, a second filtering operation in a row direction, a third filtering operation in a 45° direction, and a fourth filtering operation in a 135° direction, each one of said four filtering operations resulting in one of said four enhancement values, each of said four filtering operations centering on said primary pixel, said first filtering operation in said column direction including said primary pixel and said two pixels located in the up and down direction in relation to said primary pixel, said second filtering operation in said row direction including said primary pixel and said two pixels located in the right and left direction in relation to said primary pixel, said third filtering operation in said 45° direction including said primary pixel and said two pixels located in the 45° and 225° direction in relation to said primary pixel, said fourth filtering operation in said 135° direction including said primary pixel and said two pixels positioned in the 135° and 315° direction in relation to said primary pixel.

19. The method of claim 17, further comprising obtaining a binarized image by performing an error diffusion operation on said primary pixel outputted, wherein a length equivalent to 2 pixels can be measured from center of said primary pixel to center of each of said first four pixels respectively, and a length equivalent to $2\sqrt{2}$ pixels can be measured from said center of said primary pixel to center of each of said second four pixels respectively.

20. The method of claim 19, said four filtering operations being performed with a one-dimensional high pass filter in which coefficient of filter tab is −1, 3, −1 in sequence.

* * * * *